US012585714B1

(12) United States Patent
Selvaraj et al.

(10) Patent No.: US 12,585,714 B1
(45) Date of Patent: Mar. 24, 2026

(54) SYSTEM AND METHOD FOR EXTRACTING AND CATEGORIZING INFORMATION FROM ONLINE SOURCES

(71) Applicant: 6SENSE INSIGHTS, INC., San Francisco, CA (US)

(72) Inventors: Ernest Kirubakaran Selvaraj, Tirunelveli (IN); Samira Golsefid, Mountain View, CA (US); Viral Tarun Bajaria, Redwood City, CA (US); Satish Arjun Chilloji, Dharwad (IN); Akshay Rajendra Shah, Pune (IN); Amresh Sekar, Chennai (IN); Shubham Kumar Sunwalka, Rajasthan (IN)

(73) Assignee: 6SENSE INSIGHTS, INC., San Francisco, CA (US)

( * ) Notice: Subject to any disclaimer, the term of this patent is extended or adjusted under 35 U.S.C. 154(b) by 0 days.

(21) Appl. No.: 19/022,441

(22) Filed: Jan. 15, 2025

Related U.S. Application Data

(63) Continuation of application No. PCT/IB2024/061780, filed on Nov. 25, 2024.

(51) Int. Cl.
*G06F 7/02* (2006.01)
*G06F 16/00* (2019.01)
(Continued)

(52) U.S. Cl.
CPC .......... *G06F 16/951* (2019.01); *G06F 16/906* (2019.01); *G06F 40/30* (2020.01); *G06N 5/045* (2013.01); *G06N 20/00* (2019.01)

(58) Field of Classification Search
CPC ...... G06F 16/951; G06F 16/906; G06F 40/10; G06F 40/20; G06F 40/30; G06F 40/40;
(Continued)

(56) References Cited

U.S. PATENT DOCUMENTS

2013/0339337 A1* 12/2013 Alkhateeb ............. G06F 16/951
707/710
2022/0067581 A1* 3/2022 Kumar ................... G06N 20/20
(Continued)

FOREIGN PATENT DOCUMENTS

CN 106202259 A 12/2016
CN 109726341 A 5/2019
(Continued)

OTHER PUBLICATIONS

Rastakhiz, Fardin et al., "QuickCharNet: An Efficient URL Classification Framework for Enhanced Search Engine Optimization," IEEE, Nov. 4, 2024 (Year: 2024).*

*Primary Examiner* — Bruce M Moser
(74) *Attorney, Agent, or Firm* — Procopio, Cory, Hargreaves & Savitch LLP

(57) ABSTRACT

A system and method for efficiently extracting and categorizing business information from online sources is disclosed. The system comprises a web crawler that obtains company domains from a database and collects depth-1 URLs from company homepages. A classification model, utilizing a fine-tuned BERT architecture, predicts which URLs contain relevant information for generating tags. A content extractor then extracts content from these predicted URLs using one or more modules. Finally, a large language model (LLM) processes the extracted content and generates tags using custom prompts designed for each tag category. These prompts are tailored to the nature of the extracted content, enhancing the context provided to the LLM. This multistage approach addresses challenges in processing large-scale, unstructured business data from diverse web sources, potentially offering improved efficiency, scalability, and accuracy in automated business intelligence gathering.

10 Claims, 4 Drawing Sheets

(51) Int. Cl.
*G06F 16/906* (2019.01)
*G06F 16/951* (2019.01)
*G06F 40/30* (2020.01)
*G06N 5/045* (2023.01)
*G06N 20/00* (2019.01)

(58) Field of Classification Search
CPC ..... G06F 16/955; G06F 16/9566; G06N 5/04; G06N 5/045; G06N 20/00
See application file for complete search history.

(56) References Cited

U.S. PATENT DOCUMENTS

2023/0053204 A1 * 2/2023 As ............................ G06N 5/01
2024/0412011 A1 * 12/2024 Hoang ................... G06F 40/58

FOREIGN PATENT DOCUMENTS

CN 111581476 A 8/2020
WO WO-2023054858 A1 * 4/2023 ............. G06N 20/00

* cited by examiner

200

202

Obtain a company domain from a database and collect depth-1 URLs

204

Predict one or more URLs of the collected depth-1 URL's

206 one or more URLs are parsed for content extraction

208

Extract content from the parsed one or more URLs

210

Segment the extracted content into contextually relevant sections

212

Segmented content is processed, and business tags are generated

SYSTEM AND METHOD FOR EXTRACTING AND CATEGORIZING INFORMATION FROM ONLINE SOURCES

PRIORITY INFORMATION

The present application claims a priority from PCT application PCT/IB2024/061780 dated Nov. 25, 2024.

TECHNICAL FIELD

The present subject matter described herein, in general, relates to data processing including information retrieval and data extraction.

BACKGROUND

With the exponential growth of web content, modern crawling systems face significant technical challenges in efficiently handling large-scale data extraction and categorization. Traditional web crawlers are designed to systematically traverse webpages, collecting data by visiting links and indexing their content. However, these systems often perform redundant crawling, repeatedly visiting low-value or irrelevant URLs. This inefficiency leads to excessive computational resource usage, including high CPU consumption, memory exhaustion, and network bandwidth strain. Redundant crawling not only increases operational costs but also slows down the overall data extraction process, creating bottlenecks in scalability and efficiency.

Another critical challenge lies in the efficient extraction and organization of the collected information. Websites often feature vast amounts of diverse data, much of which is unstructured or irrelevant. Parsing and processing this information require significant computational effort, especially as many modern websites incorporate dynamic content loaded via JavaScript or AJAX. Such content adds complexity to the crawling process, requiring crawlers to execute scripts and render pages dynamically, further straining system resources. The growing prevalence of asynchronous content and complex webpage structures exacerbates these issues, making it increasingly difficult to extract relevant information at scale.

Categorizing extracted data into meaningful and contextually relevant sections adds yet another layer of complexity. Conventional systems often lack the capability to segment and analyse data effectively, leading to fragmented or incomplete categorizations. Without robust mechanisms for identifying thematic shifts or semantic relevance, crawlers often produce unstructured outputs that are challenging to interpret or apply in downstream applications. These inefficiencies undermine the ability of crawling systems to deliver actionable insights, particularly when dealing with large datasets from diverse sources. Thus, the primary technical problems facing modern web crawling systems include redundant crawling of low-value URLs: Inefficient traversal of irrelevant links leads to wasted computational resources and limits system scalability. Inefficient data extraction at scale: Handling large volumes of dynamic and asynchronous content places significant strain on system resources, including memory and CPU utilization. Challenges in data categorization: Inability to effectively structure and organize extracted data results in unstructured outputs with limited utility. Addressing these challenges is critical for the development of scalable, efficient, and accurate crawling systems capable of managing the growing complexity and volume of online content.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for efficiently extracting and categorizing information from online sources, comprising. This summary is not intended to identify essential features of the claimed subject matter nor is it intended for use in determining or limiting the scope of the claimed subject matter.

In one implementation, a method for efficiently extracting and categorizing information from online sources is disclosed. A company domain is obtained from a database, and depth-1 URLs linked from a company's homepage are collected. One or more URLs of the collected depth-1 URLs that contain information for generating tags are predicted, wherein a fine-tuned Bidirectional Encoder Representations from Transformers (BERT) model trained on a dataset comprising at least one of URLs, page titles, and page description features is used. Content is extracted from the predicted one or more URLs, wherein one or more modules are utilized to extract the content. The extracted content is processed, and tags are generated based on contextual analysis, wherein the processing instructions are dynamically adapted according to both one or more target tag categories and characteristics of the extracted content to optimize the contextual understanding of the LLM.

In another implementation, a system for efficiently extracting and categorizing information from online sources is disclosed. The system may comprise: a web crawler configured to obtain a company domain from a database, and depth-1 URLs linked from a company's homepage are collected, a classification model by which one or more URLs of the collected depth-1 URLs that contain information for generating tags are predicted, wherein the classification model may be a fine-tuned Bidirectional Encoder Representations from Transformers (BERT) model trained on a dataset comprising at least one of URLs, page titles, and page description features, a content extractor by which content is extracted from the predicted one or more URLs, wherein one or more modules may be utilized by the content extractor to extract the content; and a large language model (LLM) by which the extracted content is processed and tags are generated based on contextual analysis, wherein the processing instructions are dynamically adapted according to both one or more target tag categories and characteristics of the extracted content to optimize the contextual understanding of the LLM.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for efficiently extracting and categorizing information from online sources disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "generating," "processing," "training," "identifying," "alerting," "selecting", "transmitting", "receiving", "extracting", and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

Figure 1:
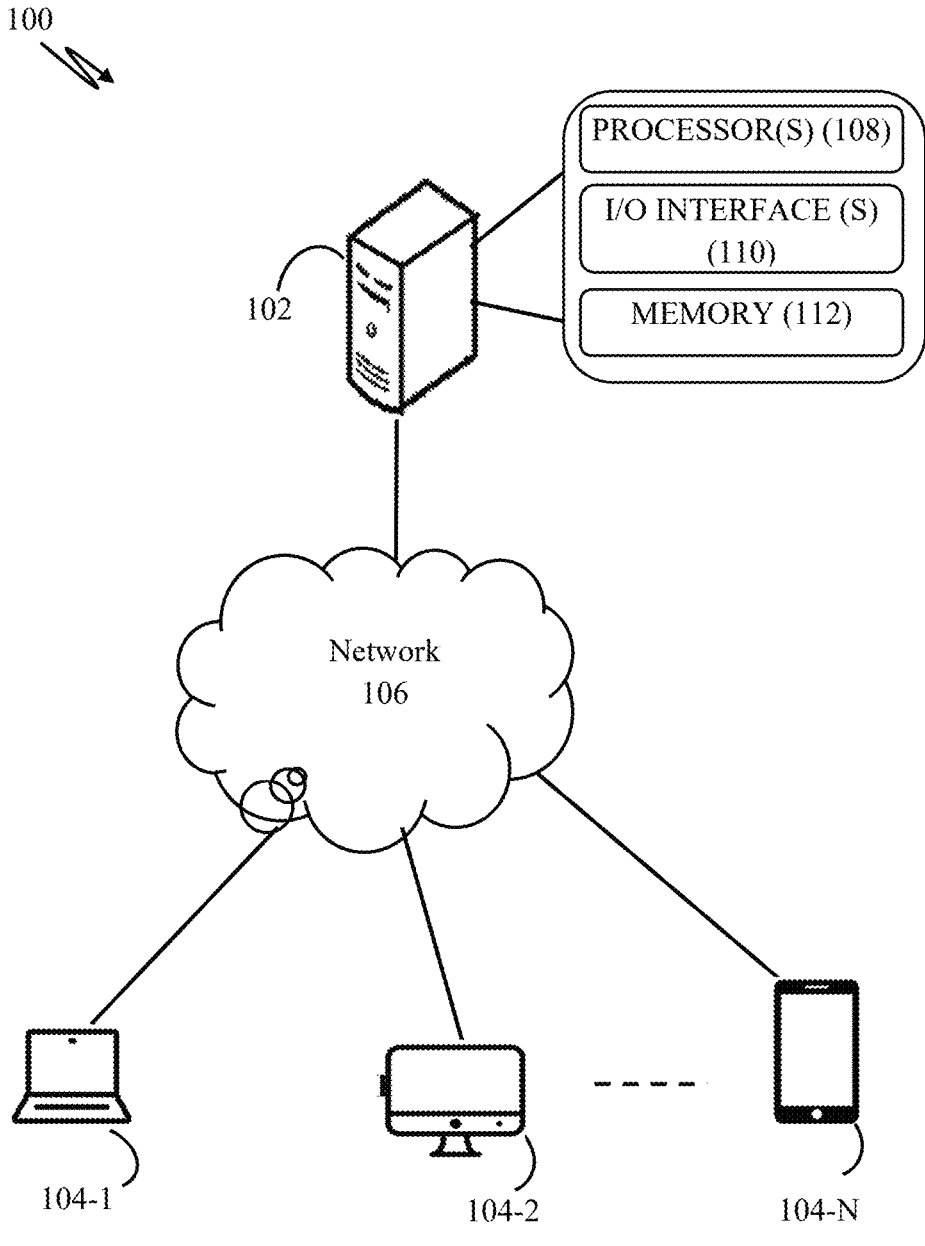
FIG. 1 illustrates a network implementation for extracting and categorizing information from online sources, in accordance with an embodiment of the present subject matter.

Referring now to FIG. 1, a network implementation 100 of a system 102 for efficiently extracting and categorizing information from online sources is disclosed. Initially, the system 102 receives user data. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives user data from one or more user devices 104. Further, the system may also 102 receive feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-3 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for efficiently extracting and categorizing information from online sources. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

In operation, the present subject matter describes the system 102 for efficiently extracting and categorizing information from online sources is provided. The system includes a web crawler configured to obtain a company domain from a database and collect depth-1 URLs linked from a company's homepage. The system also includes a classification model configured to predict one or more URLs of the collected depth-1 URL's that contain information for generating tags, wherein the classification model is a fine-tuned Bidirectional Encoder Representations from Transformers (BERT) model trained on a dataset comprising at least one of URLs, page titles, and page description features. The system further includes a content extractor configured to extract content from the predicted one or more URLs, wherein the content extractor utilizes one or more modules to extract the content. Additionally, the system includes a large language model (LLM) configured to process the extracted content and generate tags, wherein, the LLM utilizes custom prompts designed for each category of the tags to be extracted, and wherein the custom prompts are based on a nature of the extracted content to enhance the context provided to the LLM. In an embodiment, the system may be designed to handle various complexities that can arise during this process, such as dynamic content loading, handling redirects, or managing websites with unconventional navigation structures. For dynamic content loading, the system may employ a headless browser to simulate user interactions and ensure that all relevant content is captured. The system detects dynamic elements on web pages that use JavaScript to load content asynchronously. It monitors for specific DOM events that signal the completion of content loading and executes the necessary JavaScript code to render these dynamic elements. Once the content is fully loaded, the system extracts the relevant data for further processing. When handling redirects, the system is configured to follow HTTP status codes to reach the final destination URL. It maintains a redirect chain, updating the original URL references while implementing safeguards against redirect loops. This ensures that the system accurately retrieves the desired content without encountering infinite loops in redirection. Additionally, for managing websites with unconventional navigation structures, the system employs fuzzy URL matching to identify and prioritize relevant links. It utilizes sitemap parsing when available to efficiently locate important pages and implements intelligent link prioritization to navigate complex web environments effectively. This approach may address various technical challenges in processing large-scale, unstructured business data from diverse web sources, potentially offering improved efficiency, scalability, and accuracy in automated business intelligence gathering.

In an embodiment, the system 102 is configured to obtain a company domain from a database. In an embodiment, the system may be configured to obtain the company domain via a web crawler module executed by one or more processor. In an embodiment, the database may be residing within the system. In yet another embodiment, the database may be residing outside the system. The database may contain a comprehensive list of company names and their corresponding domain names, which have been previously collected, verified, and stored. The system may access the database through a secure connection, utilizing appropriate authentication methods to ensure data integrity and confidentiality. For example, when tasked with generating tags for a specific company, the system may query the database using the company name or other identifying information as a search parameter. The system may be designed with efficient indexing and search algorithms to facilitate rapid retrieval of the correct domain name. In some cases, the system may store additional metadata in the database about each company, such as industry classification or company size, which could be used to further refine the search or provide initial context for the subsequent stages of the tag generation process. The system may be configured to handle various scenarios, such as multiple domain entries for a single company or slight variations in company names, by implementing fuzzy matching algorithms or secondary verification steps.

In an embodiment, the system may be configured to collect depth-1 URLs linked from a company's homepage. In some embodiments, the system may be configured to collect depth-1 URLs linked from a company's homepage via the web-crawler. This process may occur after the system has obtained the company domain from the database. Depth-1 URLs refer to web pages that are directly linked from the company's homepage, representing the main sections or important pages of a company's website. After obtaining the company domain, the system may construct the full URL of the company's homepage (e.g., "https://www.companyname.com"). The web crawler may be configured to visit this homepage URL and parse its HTML content, identifying all hyperlinks present on the page. In some embodiments, the system may extract the href attributes of these hyperlinks, which contain the URLs of the linked pages. The system may then apply filtering criteria to retain only internal URLs belonging to the same domain or subdomains of the company. In an embodiment, an additional filtering may be implemented to exclude certain types of URLs, such as those pointing to image files, PDFs, or other non-HTML resources. The resulting list of URLs represents the depth-1 links from the company's homepage. This collection of depth-1 URLs serves as a crucial step in the data gathering process, as these pages often contain the most relevant and comprehensive information about a company's operations, offerings, and structure.

In some implementations, the system may be designed to handle various complexities that can arise during this process. For example, the system may be capable of dealing with dynamic content loading, handling redirects, or managing websites with unconventional navigation structures. For example, dynamic content loading may involve web pages that use JavaScript or other client-side scripting to load content asynchronously after the initial page load. The system may employ techniques such as waiting for specific DOM (Document Object Model) events. For example, DOM event may be any event that occurs within a document structure. These events can be triggered by user actions (like clicking a button or scrolling the page) or by the browser itself (like when the page finishes loading). DOM events allow JavaScript to register different event handlers on elements in an HTML document, enabling dynamic and interactive web pages, using headless browsers, or implementing custom JavaScript execution to ensure all relevant content is captured. In another example, handling redirects may require the system to follow HTTP redirects (e.g., status codes) to reach the final destination URL. This may involve maintaining a redirect chain, updating the original URL references, and implementing safeguards against redirect loops. In yet another example, managing websites with unconventional navigation structures may necessitate adaptive crawling strategies. The system may utilize techniques such as fuzzy URL matching, sitemap parsing, or intelligent link prioritization to navigate through websites that don't follow standard hierarchical structures.

These capabilities may ensure that the depth-1 URL collection process is robust and adaptable to the diverse landscape of corporate web presences. The collection of depth-1 URLs may serve as a bridge between the initial domain acquisition and the subsequent stages of content extraction and analysis. By focusing on these primary linked pages, the system may efficiently target the most informative and structured portions of a company's website. This approach may potentially reduce the amount of irrelevant data processed in later stages and improve the overall accuracy of the tag generation process. In some cases, the system may store the collected depth-1 URLs in a structured format, such as a database or a queue, for further processing. This storage may facilitate efficient access and management of the URLs during subsequent stages of the tag generation process, such as content extraction and analysis.

In yet another embodiment, the system may be configured to collect depth-0 URLs linked from a company's homepage. In an embodiment, depth-0 may refer to the homepage of the company's website. The web crawler may be configured to first access and analyse this depth-0 page, which typically serves as the main entry point to the company's online presence. The homepage may contain crucial information about the company's identity, primary offerings, and navigation structure. By including the depth-0 page in its crawling process, the system may ensure that it captures key business information that is often prominently displayed on the homepage, such as the company's tagline, main product categories, or recent news highlights. This depth-0 analysis may provide a foundational understanding of the company before the system proceeds to crawl the depth-1 pages linked from the homepage.

In an embodiment, the system may be configured predict a type of one or more URLs of the collected depth-1 URL's that contain information for generating tags. In yet another embodiment, the system may be configured to predict one or more URLs of the collected depth-0 URL's that contain information for generating tags. For example, the system may be configured to predict the URLs via a classification model. The classification model is a fine-tuned Bidirectional Encoder Representations from Transformers (BERT) model trained on a dataset comprising at least one of URLs, page titles, and page description features. The classification model may be trained on a dataset comprising various features of web pages, including URLs, page titles, and page description features. The dataset may be constructed by collecting and labelling a large number of web pages from diverse company websites. For example, the dataset may include: 1. URLs: "https://company.com/about", "https://company.com/products", "https://company.com/contact", 2. Page titles: "About Us | Company Name", "Our Products and Services", "Contact Information", 3. Page descriptions:

"Learn about our company history and mission", "Explore our innovative product line", "Get in touch with our sales team".

Each entry in the dataset may be labelled to indicate whether it contains relevant information for generating tags. The BERT model may be fine-tuned on this dataset, learning to associate the features of a web page with the likelihood of it containing relevant business information. The fine-tuning process may involve adjusting the model's parameters to optimize its performance on this specific classification task. Once trained, the classification model may be integrated into the system's URL processing pipeline. For each depth-1 URL collected from a company's homepage, the system may perform one or of the steps like, analysing the URL structure. The system may analyse the structure of the URL, for example identifying keywords or patterns that may indicate relevant content. For example, URLs containing 'about', 'products', or 'services' may be considered more likely to contain useful information. The system may be further configured to extract page title. The system may fetch the HTML of the page and extract the content of the title tag, which typically provides a concise description of the page's content.

In an embodiment, the system may extract meta description. The system may extract the content of the meta description tag, which provides a summary of the page's content. The meta description may include a brief overview of the page's content, key points or topics covered, relevant keywords related to the company, or a concise description of products, services, or company information. This extracted meta description, along with the URL structure and page title, provides valuable context about the page's content, helping the model make more accurate predictions about the relevance of the page for tag generation. In an embodiment, the system may process the extracted features. The system may process these features (URL, title, and description) to match the input format expected by the BERT model. This may involve tokenization, padding, and other preprocessing steps known or to be developed in the future. In an embodiment, the processed features may then be fed into the fine-tuned BERT model, which computes a probability score indicating the likelihood that the URL contains relevant information for tag generation. The system may compare the computed probability score against a predefined threshold. URLs with scores exceeding this threshold may be identified for further content extraction and processing.

Let's understand this with a help of an example, consider a company 'TechCorp' with the following depth-1 URLs: 1. https://techcorp.com/about (Title: 'About TechCorp | Our Story', Description: 'Learn about TechCorp's history, mission, and values'). 2. https://techcorp.com/products (Title: 'TechCorp Products', Description: 'Explore our innovative software solutions'). 3. https://techcorp.com/careers (Title: 'Careers at TechCorp', Description: 'Join our team and shape the future of technology'). The system may process these URLs through the classification model. The model may output the following probability scores: 1. About page: 0.95, 2. Products page: 0.88, 3. Careers page: 0.62. If the predefined threshold is set at 0.75, the system may identify the 'about' and 'products' pages for further content extraction and processing, while the 'careers' page may be excluded.

In an embodiment, the classification model may implement a feedback loop to continuously improve a prediction accuracy. As the system processes more URLs and generates tags, the system may use this information to periodically retrain or fine-tune the classification model. This ongoing refinement may help the system adapt to evolving web design trends and content presentation styles, ensuring its continued effectiveness in identifying relevant business information across a wide range of company websites. In some embodiments, the system may employ a multi-stage classification process. After the initial BERT-based classification, URLs that fall into a 'gray area' (i.e., with scores close to the threshold) may be subjected to a secondary, more detailed analysis. This secondary analysis may involve more computationally intensive techniques or even limited content extraction to make a final determination on the URL's relevance.

In some embodiments, the classification model may be configured to classify each webpage into one of several predefined categories. These categories may include, but are not limited to, About Us, Careers, Contact Us, Customer Stories, Demo, Leadership, News, Pricing, Product, Services, Resources, Solutions, and Others. The classification model may analyze the URL structure, page title, meta description, and content of each webpage to determine the most appropriate category. This categorization may help in determining the relevance of each page for extracting specific types of business information, allowing the system to focus on the most pertinent content for each tag to be generated.

Thus, the present system's primary innovation resides in its sophisticated multi-stage content processing approach. In contrast to traditional web crawlers that extract content from websites without discrimination, this solution integrates an advanced classification model. This model precisely identifies URLs likely to contain relevant business information. By implementing this targeted URL filtering, the system substantially reduces data noise and enhances the quality and relevance of extracted information. This approach minimizes the processing of irrelevant or redundant data, a common issue in conventional scraping solutions. Consequently, the system achieves a higher level of efficiency and accuracy in gathering pertinent business information.

In an embodiment, the system may be configured to parse the predicted one or more URLs for content extraction. For example, the parsing process involves analysing the HTML structure of a webpage to identify key elements and extract relevant content for tag generation. Parsing here may refer to the systematic traversal of the HTML document to understand its structure, such as headings, paragraphs, links, and other relevant elements. The parsing process may be performed by the content extractor module and may involve several steps. The content extractor may be executed by the one or more processor. Initially, the content extractor may initiate a request to fetch the web page content for each predicted URL. Upon receiving the HTML content, the extractor may create a parse tree of the HTML document using an HTML parsing module such as BeautifulSoup. This parse tree may then be navigated and searched to locate and extract specific HTML elements likely to contain relevant business information. The content extractor may also apply boilerplate removal techniques, using modules like Boilerpy3, to eliminate common web page elements such as navigation menus, headers, footers, and advertisements, focusing on the main content of the page. In some cases, certain HTML elements that provide context or structure, such as headings, lists, and tables, may be preserved using libraries like Trafilatura. Additional cleaning steps may be implemented by the system using regular expressions or custom functions to remove any remaining noise.

In an example, the web crawler may parse at multiple depth levels of a web address. Depth level of a web address may indicate a number of levels inside the web address and these levels are determined by the inputs or clicks a user has to provide from a home page. In case of a web address of a company, a home page is considered as depth level 0. A web page which is accessed from the home page or depth level 0 is considered as depth level 1. A web page which is accessed from the depth level 1 is considered as depth level 2, and so on. In an implementation, the web crawler may parse up to multiple depth levels of the web address of the companies. In an example, the web crawler may be a computer program that crawls and navigates through web addresses using different links available in the web addresses and extracts data out of each webpage associated with the web address. In an implementation, the web crawler may fetch web pages associated with the web address and extract hyperlinks (i.e., URLs) to other web pages.

In one embodiment, the data for each depth level of a website is stored separately, and an indexing mechanism is used to organize and retrieve the data. For example, the system may begin by initiating a web-crawling operation at a starting URL (depth level 0) and progressively explores subsequent pages at deeper levels within the website hierarchy. As the crawler navigates through the website, data from each depth level is extracted and stored in a separate storage location dedicated to that particular depth. For instance, content retrieved from the root page (depth level 0) is stored in a first storage unit, while content from pages linked directly from the root (depth level 1) is stored in a second storage unit. This process is repeated for each additional depth level (e.g., depth levels 2, 3, and so on), ensuring that data associated with each depth level is isolated and stored in a corresponding storage unit. Once the data has been stored for each depth level, an indexing process is performed. The indexing mechanism associates each piece of stored content with a unique index entry that includes, but is not limited to, a reference to the URL of the crawled page, the depth level of the page, metadata such as title, keywords, and content summaries, links to child pages and their respective depth levels. The index is hierarchically structured to reflect the website's link architecture, facilitating efficient data retrieval. For example, index entries at depth level 0 may contain references to URLs and metadata for the main website's homepage, while entries at depth level 1 may contain data for subpages directly linked from the homepage. Each index entry may also include references to the subsequent depth level (e.g., depth level 2) to maintain continuity across the hierarchy. In an embodiment, during a data retrieval operation, the index is utilized to efficiently locate and access stored content. The system can query the index to determine the relevant depth level where the desired information is stored. Based on this information, the system retrieves the stored data without the need to re-crawl the website. For example, if a query pertains to general site information, the system may first reference depth level 0 or 1 index entries. In contrast, if more detailed content is required, the system may search deeper levels of the index. In an example, the index prioritizes data retrieval based on depth levels. For instance, the system may prioritize fetching data from shallower depths (e.g., levels 0 and 1) before proceeding to deeper levels (e.g., level 2 or beyond), allowing for more efficient querying and reduced computational load. By storing crawled data for each depth level separately and employing an indexing mechanism, this embodiment provides an optimized approach to managing and retrieving large-scale web data. The system reduces unnecessary computational overhead and ensures faster data access by utilizing the index for targeted queries and minimizing redundant crawling operations.

In an embodiment, the web crawler may employ distributed data processing architecture to facilitate bulk parsing. For example, the web crawler may generate a plurality of worker nodes to parse multiple data sources. For example, each worker node of the plurality of worker nodes is allocated a set of data sources for traversal and data extraction. In an embodiment, the web crawler is implemented by distributed real-time data processing architecture, such as Apache Storm. The web crawler may further be implemented through a master node and a plurality of worker nodes. Each worker node may be capable of running one or more parsing processes. The master node may be configured to generate the worker nodes. Each of the worker nodes may execute a parsing process to parse web addresses provided by the system. In an example, the master node may serve as a scheduler to instruct the parsing processes to initiate the parsing.

Considering an example in which the master node is provided a list of 100 million web addresses for being parsed. The master node may generate 20 worker nodes and distribute the 100 million web addresses amongst the 20 worker nodes. Accordingly, each worker node may be allocated a set of web addresses, i.e., 10 million web addresses for parsing. The worker nodes may parse the web addresses as instructed by the master node. In the present example, the master node may specify a degree of depth level up to which each web address is to be parsed by the worker nodes. Indicating the degree of depth levels for parsing may provide quicker results. In a preferred embodiment, each worker node may be instructed to parse up to multiple depth levels for each web address. In an example, the worker nodes may send, in real-time, any new web addresses that may be found during parsing a web address to the master node. The master node may update, in real-time, the list or queue of web addresses stored in the system. Further, the worker nodes may extract and store the data associated with each depth level of a web address. For example, the worker nodes may extract the data in HTML format and store the extracted data into a corresponding storage space. In an example, the worker nodes may interact with different elements of each web address to extract the data of interest, such as the HTML data. In addition, the system may employ a storage unit, such as a Remote Dictionary Server (Redis) cluster, to store the data extracted by each worker node.

In an embodiment, the Redis cluster may maintain an index of all parsed web addresses. In an example, the master node may create the index of all parsed web addresses in the Redis cluster. Before a worker node initiate parsing of a new web address, the worker node may check for the new web address in the index maintained in the Redis cluster. If the new web address is not located in the index, it may indicate that the worker nodes have not yet parsed the new web address. Thus, parsing may be initiated on the new web address. On the other hand, if the new web address is located in the index, it may indicate that the worker nodes have already parsed the new web address. Thus, redundant parsing of same web address may be avoided. In an embodiment, the web crawler may store the data (such as HTML data etc.) extracted from the plurality of data sources in a storage unit, such as a database. In an embodiment a worker node may include an individual hardware processor. In an embodiment the master node may include an individual hardware processor.

Thus, the present system's primary innovation resides in its sophisticated multi-stage content processing approach. In contrast to traditional web crawlers that extract content from websites without discrimination, this solution integrates an advanced classification model. This model precisely identifies URLs likely to contain relevant business information. By implementing this targeted URL filtering, the system substantially reduces data noise and enhances the quality and relevance of extracted information. This approach minimizes the processing of irrelevant or redundant data, a common issue in conventional scraping solutions. Consequently, the system achieves a higher level of efficiency and accuracy in gathering pertinent business information.

In an embodiment, the web crawler module may be implemented using specialized hardware components to enhance its performance and efficiency. It may incorporate a dedicated processor, such as a multi-core CPU optimized for parallel processing, to handle multiple crawling tasks simultaneously. The crawler may also utilize a high-speed solid-state drive (SSD) for rapid data storage and retrieval, enabling quick access to crawled data and URL queues. To manage network operations efficiently, the web crawler may employ a dedicated network interface card (NIC) with hardware-level packet processing capabilities, allowing for high-throughput data transfer and reduced CPU overhead. Additionally, the crawler may leverage specialized hardware accelerators, such as Field-Programmable Gate Arrays (FPGAs) or Graphics Processing Units (GPUs), to offload specific tasks like HTML parsing, JavaScript execution, or pattern matching. These hardware accelerators can significantly speed up content extraction and analysis processes. The web crawler's memory subsystem may include a combination of high-speed RAM for active processing and non-volatile memory for persistent storage of crawl states and data. This hardware configuration enables the web crawler to operate with enhanced speed, scalability, and energy efficiency, facilitating rapid and comprehensive data collection from diverse web sources.

In an embodiment, the master node and worker nodes may share the same hardware configurations as the web crawler. For example, the master node, worker nodes, and web crawler may utilize multi-core CPUs optimized for parallel processing, high-speed RAM for active data processing, SSDs for rapid storage and retrieval, and optional accelerators such as GPUs or FPGAs for handling tasks like JavaScript execution, HTML parsing, or pattern matching. This shared configuration ensures uniformity and allows seamless scaling for distributed crawling tasks. In another embodiment, the master node and worker nodes may be implemented as distinct hardware systems, separate from the web crawler. The master node may use a processor optimized for task scheduling and real-time queue management, while worker nodes are equipped with hardware tailored for intensive data extraction and parsing tasks, such as high-performance GPUs or FPGAs. These distinctions allow for specialized optimization of each component based on its functionality within the system.

In an embodiment where shared hardware is used, the master node and worker nodes may rely on uniform configurations such as multi-core CPUs, high-speed RAM, SSDs, and hardware accelerators to facilitate efficient parsing and data distribution. The worker nodes leverage these configurations to ensure rapid processing and interaction with the master node, enabling scalability for large datasets. In another embodiment where distinct hardware is employed, the master node may utilize a dedicated processor for efficient scheduling and queue updates, while worker nodes rely on more resource-intensive hardware configurations, such as GPUs or FPGAs, to parse and analyse for example, the 10 million URLs assigned to them. This approach allows the system to optimize resource allocation and achieve high performance in distributed environments.

In an embodiment, the system may be configured to extract content from the parsed one or more URLs. For example, the system may be configured to extract the content via a content extractor module. The content extractor may utilize one or more modules to extract the content. The one or more modules, but not limited to, may include at least one of BeautifulSoup, Trafilatura, or Boilerpy3. In an embodiment, the content extraction process may begin with the content extractor receiving a list of URLs predicted to contain relevant information for tag generation. For each URL, the system may initiate a request to fetch the web page content. Upon receiving the HTML content of a web page, the system may employ BeautifulSoup, an HTML parsing module, to create a parse tree of the HTML document. BeautifulSoup may be utilized to navigate and search the document structure efficiently, allowing the system to locate and extract specific HTML elements that are likely to contain relevant business information. Once the relevant HTML elements are identified, the system may extract the text content from these elements. BeautifulSoup's methods may be employed to strip HTML tags and retrieve the raw text.

In yet another embodiment, the system may be configured to utilize Boilerpy3, a module specialized in boilerplate removal and fulltext extraction. Boilerpy3 may be applied to the extracted text to remove common web page elements such as navigation menus, headers, footers, and advertisements, focusing on the main content of the page. In yet another embodiment, where maintaining some structural information is beneficial, the system may employ Trafilatura. This module may be used to extract content while preserving certain HTML elements that provide context or structure, such as headings, lists, and tables. The system may implement additional cleaning steps using regular expressions or custom functions to remove any remaining noise, such as excessive whitespace, special characters, or irrelevant text patterns.

In an embodiment, the content extractor may incorporate language detection functionality to identify the language of the extracted text. This information may be useful in subsequent processing steps, particularly when dealing with multilingual content. In some implementations, the system may segment the extracted content into logical sections based on HTML structure or content patterns. This segmentation may facilitate more granular analysis in later stages of the tag generation process. The content extractor may also extract relevant metadata from the HTML document, such as the page title, meta description, and any structured data that may provide additional context for tag generation. The system may implement robust error handling mechanisms to manage various scenarios, such as network errors, malformed HTML, or unexpected page structures. This may ensure the content extraction process remains resilient and continues to function across a diverse range of websites. The extracted and cleaned content may be stored in a structured format, such as JSON or XML, along with relevant metadata and the original URL. This structured storage may facilitate efficient retrieval and processing in subsequent stages of the tag generation pipeline. By leveraging these one or more modules in combination, the content extractor may achieve a balance between comprehensive content extraction and noise reduction. This approach may enable the system to handle a wide variety of web page structures and content presentations, ensuring that the most relevant information is extracted for tag generation while minimizing the inclusion of irrelevant or redundant data.

In an embodiment, the content extractor may operate on a hardware system configured to support its processing requirements efficiently. The hardware may include one or more processors, memory units, and storage devices to execute the modules used for content extraction. For instance, the system may leverage multi-core processors to enable parallel processing of multiple URLs simultaneously, thereby enhancing throughput and reducing processing time. The memory units may be configured to temporarily store parsed HTML content and intermediate data structures, facilitating efficient processing by modules like BeautifulSoup, Trafilatura, and Boilerpy3. In addition, the system may include high-capacity storage devices, such as SSDs, for storing extracted content, metadata, and structured outputs in formats like JSON or XML. The hardware may also incorporate high-speed network interfaces to fetch web page content from remote servers, ensuring minimal latency and uninterrupted operation. This configuration allows the content extractor to manage diverse workloads effectively, ensuring the system remains resilient and scalable while handling various web content structures.

In an embodiment, the content extractor may be configured to segment the extracted content into sections based on contextual relevance. This segmentation process may enhance the system's ability to organize and analyze the extracted information, potentially improving the accuracy and granularity of the generated tags. The content extractor may employ various techniques to perform this contextual segmentation. For example, the system may analyze the HTML structure of the page, identifying natural divisions such as headings, paragraphs, and sections. The system may use one or more parsing modules like BeautifulSoup to traverse the document's structure and identify these elements. In an embodiment, the content extractor may utilize natural language processing (NLP) techniques to identify thematic shifts within the text. This may involve techniques such as topic modeling or text clustering algorithms. For instance, the system may employ Latent Dirichlet Allocation (LDA) or other topic modeling algorithms to identify distinct themes or topics within the extracted content. The content extractor may use semantic analysis to understand the meaning and context of different parts of the text. This may involve the use of word embeddings or more advanced language models to capture semantic relationships between different sections of the content. For example, the system may use pre-trained word embeddings like Word2Vec or GloVe to compute semantic similarity between different parts of the text, helping to identify coherent sections. In some cases, the system may employ a hybrid approach, combining structural, thematic, and semantic analysis to achieve more accurate segmentation. This may involve a multi-step process where the content is first divided based on HTML structure, then further refined based on thematic and semantic coherence.

In an embodiment, the content extractor may also identify visual cues present in the original web page, such as whitespace, horizontal lines, or changes in font style or size. While these visual elements may not be directly present in the extracted text, the system may infer their presence from the HTML structure and use this information to inform the segmentation process. To handle varying content structures across different websites, the content extractor may employ adaptive segmentation strategies. The content extractor may analyse patterns in the content and adjust its segmentation approach based on the specific characteristics of each webpage. For instance, the content extractor may use different thresholds or criteria for identifying section boundaries depending on the overall length and structure of the content. For example, the system may also implement a hierarchical segmentation approach, where the content is first divided into major sections, and then each major section is further subdivided into smaller, more specific subsections. This hierarchical structure may provide a more nuanced representation of the content's organization, potentially facilitating more precise tag generation. In some implementations, the content extractor may employ machine learning models specifically trained for content segmentation tasks. These models may be trained on a diverse dataset of web content, learning to identify meaningful section boundaries based on various textual and structural features. The dataset used to train these machine learning models may be a diverse collection of web content, carefully curated to represent a wide range of business websites across different industries, sizes, and geographical locations.

For example, the dataset may include corporate websites of Fortune 500 companies, small and medium-sized business websites, e-commerce platforms, technology startup websites, professional service firm websites, non-profit organization websites, government agency websites, and educational institution websites. The dataset may comprise thousands of web pages, each annotated to identify meaningful section boundaries. These annotations may serve as the ground truth for training the machine learning models. The features used for training may include both textual and structural elements of the web content. Textual features may encompass word and phrase frequencies, sentence and paragraph lengths, presence of specific keywords or phrases, semantic similarity between adjacent text blocks, and topic coherence within text segments. Structural features may include HTML tag hierarchy, presence and placement of heading tags, use of div and section tags, presence of list elements, table structures, presence of horizontal rules, and CSS class and ID attributes that may indicate content divisions. During training, the models may learn to recognize patterns and cues that indicate meaningful section boundaries. For example, the model may learn that a combination of a heading tag, followed by a paragraph, and then a list often constitutes a coherent section. The model may learn to identify thematic shifts in the content that signal the start of a new section, even in the absence of explicit structural markers. Once trained, these models may be integrated into the content extractor component of the system. When processing a new webpage, the content extractor may feed the extracted content through these trained models to identify section boundaries. The output of these models may be a set of predicted section breaks, which the system can use to segment the content into contextually relevant sections. The use of these machine learning models may allow the content extractor to adapt to various content structures and writing styles across different websites. This adaptability may be particularly valuable when dealing with websites that use non-standard or creative layouts, where simple rule-based segmentation approaches might fail. Moreover, these models may be periodically retrained or fine-tuned as new data becomes available, allowing the system to stay current with evolving web design trends and content presentation styles. This ongoing refinement may help ensure that the content segmentation remains effective and accurate over time, contributing to the overall robustness and reliability of the tag generation system.

In an embodiment, the segmented content may be stored in a structured format, preserving the hierarchical relationships between different sections. This structured representation may be used in subsequent stages of the tag generation process, allowing the system to generate tags that are not only accurate but also contextually relevant to specific sections of the content. By segmenting the extracted content based on contextual relevance, the system may be better equipped to handle complex and diverse web content, potentially improving the accuracy and granularity of the generated tags. This contextual segmentation may enable the system to capture nuanced information about different aspects of a business, providing a more comprehensive and structured representation of the extracted content. On the other hand, the absence of contextual information in traditional systems may lead to inaccuracies in tag generation and data inconsistencies. For example, consider a company website with a page describing both their current products and their company history. A traditional system may extract all the text from this page and process it as a single unit, leading to conflicting or inaccurate tags and introducing inconsistencies in the representation of the data. Such a system might incorrectly identify the company's primary industry as both their current focus (e.g., 'Artificial Intelligence') and their historical focus (e.g., 'Database Management'). The system may confuse the company's founding year with the launch year of their current main product, or generate product tags for historical offerings that are no longer relevant. In contrast, the present disclosed system with contextual segmentation and enhanced data consistency would recognize these as separate sections, allowing for more accurate and nuanced tag generation. This contextual understanding enables the system to distinguish between current and historical information, associate dates and products correctly, and generate tags that more accurately reflect the company's current status and offerings. By leveraging contextual information, the system can provide a more precise and relevant representation of the business, avoiding the conflation of disparate information that can occur in traditional systems lacking contextual awareness.

This may be understood with the help of a following example, In the absence of contextual information provided by content segmentation, a traditional system might generate inaccurate or misleading business tags. Here's an example to illustrate this: Consider a company's website that has a single long page containing information about their products, pricing, and customer testimonials. Without contextual segmentation, a traditional system might process this entire page as a single block of text. For instance, the page might contain the following content: "Our flagship product, TechPro, offers cutting-edge features for enterprise-level businesses. Starting at just $99 per month, TechPro is an affordable solution for companies of all sizes. 'TechPro revolutionized our workflow!'—John Smith, CEO of Small-Biz Inc." A traditional system, lacking contextual understanding, might generate the following inaccurate tags: 1. Product: TechPro 2. Price: $99 3. Target Audience: Companies of all sizes, SmallBiz Inc. 4. Customer: John Smith. These tags, while partially correct, fail to capture the nuanced context of the information. The price tag doesn't specify that it's a monthly fee, the target audience is over-generalized, and John Smith is incorrectly labelled as a customer rather than a testimonial source. In contrast, a system with contextual segmentation would recognize the distinct sections of this content: 1. Product Description: "Our flagship product, TechPro, offers cutting-edge features for enterprise-level businesses." 2. Pricing Information:

"Starting at just $99 per month, TechPro is an affordable solution for companies of all sizes." 3. Customer Testimonial: ""TechPro revolutionized our workflow!'-John Smith, CEO of SmallBiz Inc." With this contextual understanding, the system could generate more accurate and nuanced tags: 1. Product: TechPro 2. Product Features: Cutting-edge, Enterprise-level 3. Pricing Model: Subscription 4. Starting Price: $99 per month 5. Target Audience: Enterprise-level businesses, Companies of all sizes 6. Testimonial: Provided by John Smith, CEO of SmallBiz Inc. This example demonstrates how contextual segmentation allows for more accurate, detailed, and contextually relevant business tag generation, avoiding the oversimplifications and misinterpretations that can occur in traditional systems lacking this capability.

In an embodiment, the system may be configured to process the extracted content and generate tags. The system may process the extracted content via a large language model (LLM). For example, the LLM utilizes custom prompts designed for each category of the tags to be extracted. The custom prompts may be based on a nature of the extracted content to enhance the context provided to the LLM. For example, the tags generated by the system may include, but are not limited to, industry vertical, headquarter address, countries of operation, contact details, leadership information, product names, business type, solution offerings, business model, current stage of development, technology stack, target audience, and company description.

In an embodiment, the LLM employed in this system may be a state-of-the-art model such as GPT-3, GPT-4, or a similar architecture, fine-tuned for the specific task of tag generation. This fine-tuning process may involve training the model on a large corpus of business-related text, allowing it to develop a deep understanding of business terminology, concepts, and contexts across various industries and business types. The training data for this fine-tuning process may encompass a diverse range of business-related content, including, but not limited to, annual reports and financial statements from publicly traded companies across different sectors, providing insights into industry-specific financial terminology and reporting practices; Press releases and news articles about companies, startups, and industry trends, offering current and historical context on business developments and market dynamics; Company websites and marketing materials, showcasing how businesses present themselves, their products, and their value propositions; Industry reports and market analyses from reputable consulting firms and research institutions, providing in-depth insights into various sectors and business models; Academic papers and case studies on business strategies, management practices, and organizational structures, offering theoretical frameworks and real-world examples; Job descriptions and career pages from companies of various sizes and industries, providing information on organizational structures, roles, and required skill sets; Patent applications and technical documentation, particularly for technology-focused companies, offering insights into innovation trends and technical terminology; Social media posts and professional networking profiles of business leaders and companies, capturing less formal business communication and personal branding; Business plans and pitch decks from startups and established companies, providing examples of how businesses articulate their vision, market opportunity, and growth strategies; Regulatory filings and legal documents related to business operations, mergers, acquisitions, and corporate governance; Customer reviews and testimonials, offering insights into how products and services are perceived in the market;

Industry-specific glossaries and terminology databases, ensuring comprehensive coverage of specialized business language across different sectors. This diverse dataset may be curated to ensure representation across various industries (e.g., technology, finance, healthcare, manufacturing, retail), company sizes (from startups to multinational corporations), and geographical regions. The training data may be regularly updated to include recent business trends, emerging industries, and evolving terminology.

To enhance the accuracy and relevance of the generated tags, the system may utilize custom prompts designed for each category of tags to be extracted. These prompts may be crafted to guide the LLM's attention towards specific aspects of the business information contained in the extracted content. The custom prompts may be based on the nature of the extracted content, allowing the system to provide enhanced context to the LLM and improve the quality of the generated tags. For example, when generating tags related to the company's industry vertical, the system may use a prompt such as: "Based on the following extracted content, identify the primary industry or sector in which this company operates. Consider any explicit mentions of industry classifications as well as implicit indicators such as products, services, or target markets described in the text." Similarly, for generating tags related to the company's product names, the prompt might be: "analyse the following text and list the specific names of products or services offered by this company. Include both explicitly mentioned product names and any products that can be inferred from the company's described activities or value propositions." For extracting leadership information, the system might employ a prompt like: "From the given content, identify and list key leadership positions and the names of individuals holding these positions within the company. Include roles such as CEO, CFO, CTO, and other executive positions if mentioned."

In an embodiment, the system may maintain a comprehensive module of these custom prompts, each tailored to extract specific categories of tags. This module may cover all the identified tag categories, including headquarter address, countries of operation, contact details, business type, solution offerings, business model, current stage of development, technology stack, target audience, and company description. The prompt module may be designed as a dynamic and extensible database, allowing for easy addition, modification, or removal of prompts as needed. Each prompt in the module may be associated with metadata such as its target tag category, performance metrics, and usage statistics. The prompt module may be regularly updated and refined based on the performance of the tag generation process and evolving business information needs. This refinement process may involve a performance analysis, where the system tracks the accuracy and relevance of generated tags for each prompt. Prompts that consistently yield high-quality tags may be prioritized, while those that underperform may be flagged for review or revision. The system may also employ machine learning techniques to automatically generate and test new prompt variations, continuously optimizing the prompt module. When processing the extracted content, the system may first analyse the nature of the content to determine which custom prompts are most appropriate. This analysis may involve techniques such as topic modelling, keyword extraction, or semantic similarity comparisons to identify the main themes and focus areas of the extracted content. For example, the system may employ advanced natural language processing (NLP) algorithms for this analysis. For instance, the system may use Latent Dirichlet Allocation (LDA) for topic modelling to identify the primary themes in the content. In another embodiment, the system may utilize named entity recognition (NER) to identify specific entities such as company names, locations, or product names that could indicate relevant tag categories. In an embodiment, the system may employ word embedding techniques like Word2Vec or BERT to compute semantic similarities between the extracted content and predefined category descriptors. This semantic analysis may help identify subtle thematic connections that might not be apparent through simple keyword matching. In an embodiment, based on the above one or more analysis, the system may assign relevance scores to each prompt in the module. These scores may reflect how well each prompt aligns with the identified themes and entities in the extracted content. The system may then select a subset of the most relevant prompts for use in tag generation. In an embodiment, the system may dynamically modify the selected prompts based on the specific characteristics of the extracted content. For example, if the content analysis reveals a strong focus on technological innovation, the system may augment the 'technology stack' prompt with additional context-specific questions or keywords. In an embodiment, the system may implement a hierarchical prompt selection strategy, where it first applies high-level prompts to categorize the general nature of the business, and then selects more specific, granular prompts based on this initial categorization. This approach may allow for more nuanced and accurate tag generation, particularly for businesses with complex or multifaceted operations. In an embodiment, the system may incorporate feedback loops where the effectiveness of prompt selections is continuously evaluated. If certain prompt combinations consistently yield high-quality tags for specific types of businesses or content, the system may learn to prioritize these combinations in similar future scenarios. This adaptive approach may allow the system to continuously refine its prompt selection strategy, improving the overall accuracy and relevance of the generated tags over time.

In an embodiment, based on this analysis, the system may select and apply the most relevant custom prompts to the extracted content. These prompts, along with the extracted content, may then be fed into the LLM. The LLM may process this input, leveraging its pre-trained knowledge and the context provided by the custom prompts to generate the tags. The LLM may generate the tags in a structured format, such as a JSON object, where each tag category is associated with one or more generated tags. For example: {"industry_vertical": ["Software as a Service", "Enterprise Technology"], "headquarter_address": "123 Tech Avenue, San Francisco, CA 94105, USA", "countries_of_operation": ["United States", "United Kingdom", "Germany", "Japan"], "contact_details": {"phone": "+1 (555) 123-4567", "email": "info@techcompany.com"}, "leadership_information": [{"role": "CEO", "name": "Jane Doe"}, {"role": "CTO", "name": "John Smith"}], "product_names": ["TechSuite Pro", "DataAnalyzer 3000", "CloudConnect"], "business_type": "B2B Software Provider", "solution_offerings": ["Enterprise Resource Planning", "Data Analytics", "Cloud Integration"], "business_model": "Subscription-based SaaS", "current_stage_of_development": "Growth Stage", "technology_stack": ["Python", "React", "AWS", "TensorFlow"], "target_audience": ["Mid-size Enterprises", "Fortune 500 Companies"], "company_description": "A leading provider of innovative enterprise software solutions, specializing in data analytics and cloud integration for businesses of all sizes."}

To further enhance the accuracy and relevance of the generated tags, the system may implement a multi-pass approach. In this approach, the LLM may first generate an initial set of tags based on the extracted content and custom prompts. The system may then use these initial tags to generate more specific follow-up prompts, allowing the LLM to refine and expand upon its initial analysis. In an embodiment, the system may implement confidence scoring for the generated tags. The LLM may assign a confidence score to each generated tag, indicating the model's certainty in its accuracy. Tags with low confidence scores may be flagged for human review or may trigger the system to seek additional information from other sections of the website or alternative sources. To handle cases where the extracted content may be ambiguous or insufficient to generate certain categories of tags, the system may be designed to generate 'unknown' or 'not enough information' tags rather than making unfounded guesses. This approach may help maintain the overall reliability and trustworthiness of the generated tags. The system may also incorporate a feedback loop mechanism, where the accuracy of generated tags is periodically evaluated, either through automated checks against known information or through human review. This feedback may be used to continuously improve the custom prompts, fine-tune the LLM, and enhance the overall performance of the tag generation process. By leveraging the power of LLMs and employing carefully designed custom prompts, this system may be capable of generating highly accurate and contextually relevant tags from extracted web content across a wide range of categories. This approach may allow for the efficient processing of large volumes of business information, enabling the creation of comprehensive and up-to-date business intelligence databases that capture diverse aspects of company profiles and operations.

In an embodiment, the system may comprise a content curator configured to filter and organize the extracted content before passing it to the LLM. The content curator may use natural language processing techniques. The content curator may serve as an intermediate processing stage, refining and structuring the raw extracted content to enhance the efficiency and accuracy of the subsequent tag generation process. This component may leverage various natural language processing (NLP) techniques to analyze, clean, and organize the extracted text. The content curator may perform one or more functions like, 1. Content Filtering: The curator may employ text classification algorithms to identify and remove irrelevant or low-quality content. This may include filtering out boilerplate text, advertisements, navigation menus, and other non-informative elements that may have been extracted along with the main content. The filtering process may use pre-trained models capable of distinguishing between informative business content and noise. 2. Language Detection and Translation: In cases where the extracted content is in multiple languages, the curator may use language detection algorithms to identify the primary language of each text segment. For non-English content, the system may employ machine translation techniques to convert the text into English, ensuring consistency in the input provided to the LLM. 3. Text Normalization: The curator may apply various text normalization techniques to standardize the extracted content. This may include converting all text to lowercase, removing excess whitespace, expanding contractions, and standardizing date and number formats. Such normalization may help ensure consistency in the input provided to the LLM, potentially improving its performance. 4. Named Entity Recognition (NER): The curator may utilize NER models to identify and tag important entities within the text, such as company names, person names, locations, and product names. This pre-processing step may help highlight key information for the LLM and improve the accuracy of tag generation for categories like leadership information and product names. 5. Topic Modeling: The curator may apply topic modeling techniques, such as Latent Dirichlet Allocation (LDA) or more advanced neural topic models, to identify the main themes present in the extracted content. This information may be used to provide additional context to the LLM or to guide the selection of appropriate custom prompts. 6. Text Summarization: For lengthy extracted content, the curator may employ extractive or abstractive summarization techniques to condense the information while retaining key points. This may help focus the LLM's attention on the most salient information and improve processing efficiency. 7. Sentiment Analysis: The curator may perform sentiment analysis on the extracted content to gauge the overall tone and sentiment expressed. This information may be valuable for generating tags related to company culture or public perception. 8. Keyword and Key Phrase Extraction: The curator may use algorithms to identify and extract important keywords and key phrases from the text. These may serve as additional inputs to the LLM or be used to cross-reference and validate the generated tags. 9. Coreference Resolution: To improve the coherence of the extracted content, the curator may apply coreference resolution techniques to resolve pronouns and other references to their antecedents. This may help provide more context and clarity to the LLM. 10. Content Structuring: The curator may organize the processed content into a structured format, such as JSON or XML, grouping related information and creating a hierarchical representation of the extracted data. This structured format may make it easier for the LLM to process and understand the relationships between different pieces of information. The content curator may employ a pipeline architecture, where the extracted content passes through these various processing stages sequentially. Alternatively, it may use a more flexible, modular approach where different NLP techniques are applied based on the specific characteristics of the extracted content. In an embodiment, the curator may also incorporate machine learning models that can be fine-tuned on domain-specific data, allowing it to adapt to the particular characteristics and terminology of different industries or types of business content.

In an embodiment, to ensure optimal performance, the content curator may employ a feedback loop mechanism. The quality and relevance of the curated content may be evaluated based on the performance of the LLM in generating accurate tags. This feedback may be used to continuously refine and improve the curation process, adjusting the parameters of the various NLP techniques or updating the underlying models. By implementing this sophisticated content curation stage, the system may significantly enhance the quality and relevance of the input provided to the LLM. This may lead to more accurate and contextually appropriate tag generation, improving the overall performance and reliability of the system. The content curator may serve as a critical bridge between the raw extracted web content and the advanced language understanding capabilities of the LLM, ensuring that the LLM receives high-quality, well-structured input for optimal tag generation.

Figure 2:
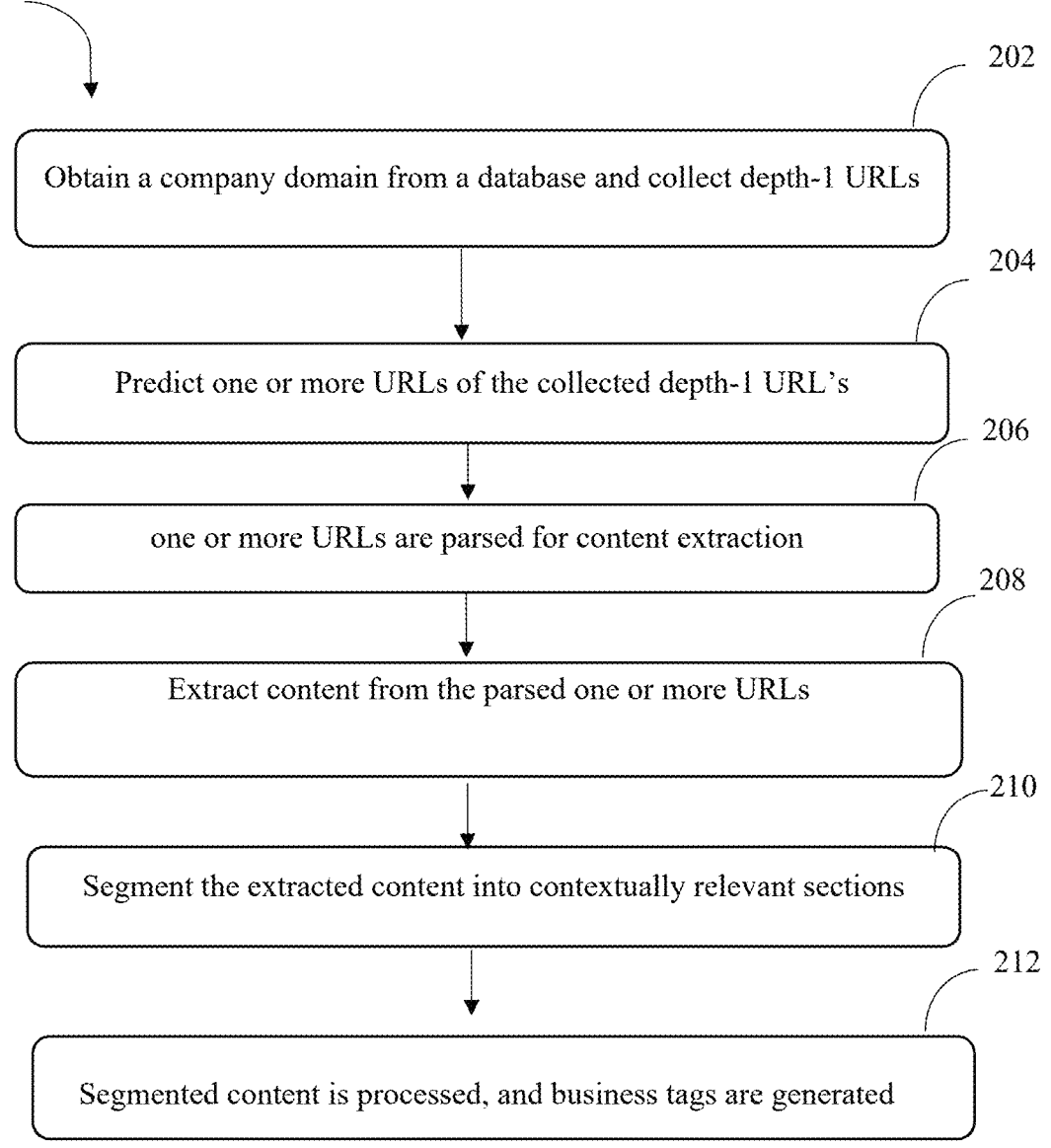
FIG. 2 illustrates a method for extracting and categorizing information from online sources, in accordance with an embodiment of the present subject matter.

Referring now to FIG. 2, a method 200 for efficiently extracting and categorizing information from online sources, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for automatically generating an email and associated email strategy based on user data. Additionally, individual blocks may be deleted from the method 200 without departing from the scope of the subject matter described herein. Furthermore, the method 200 for efficiently extracting and categorizing information from online sources can be implemented in any suitable hardware, software, firmware, or combination thereof. However, for ease of explanation, in the embodiments described below, the method 200 may be considered to be implemented in the above-described system 102.

At block 202, the system obtains a company domain from a database and collect depth-1 URLs linked from a company's homepage.

At block 204, one or more URLs of the collected depth-1 URL's that contain information for generating tags, is predicted. The prediction is performed by using a classification model.

At block 206, the one or more URLs are parsed for content extraction.

At block 208, content is extracted from the parsed one or more URLs.

At block 210, the extracted content is segmented into contextually relevant sections using on natural language processing (NLP) techniques to identify thematic shifts and semantic relevance.

At block 212, the segmented content is processed, and tags are generated.

Figure 3:
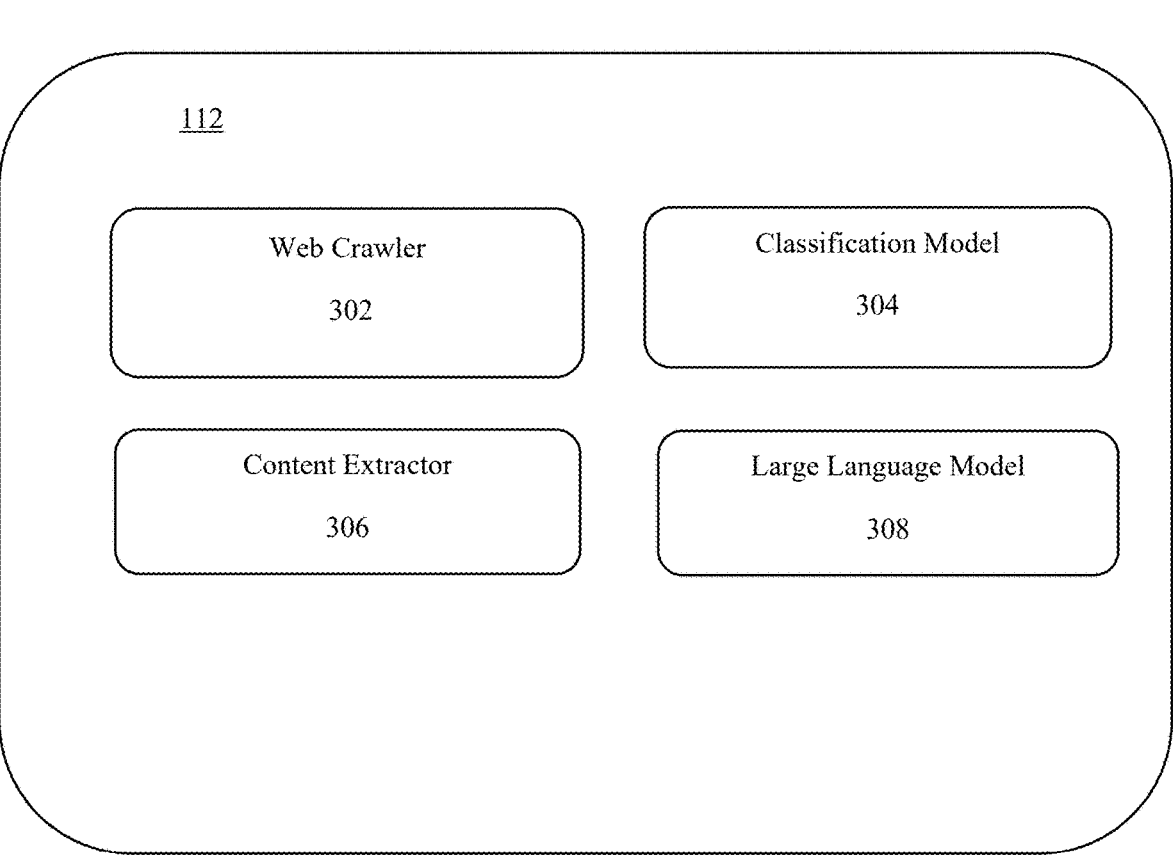
FIG. 3 illustrates an example for one or more modules, in accordance with an embodiment of the present subject matter.

Referring now to FIG. 3, one or more modules of the system used to perform the method described in FIG. 2 are disclosed. For example, a company domain is obtained, and depth-1 URLs are collected using a web crawler module 302. Further, one or more URLs of the collected depth-1 URL's that contain information for generating tags, is predicted via the classification model 304. The content is extracted from the predicted one or more URLs via the content extractor module 306. Furthermore, extracted content is processed, and tags are generated via the Large Language Model 308.

Figure 4:
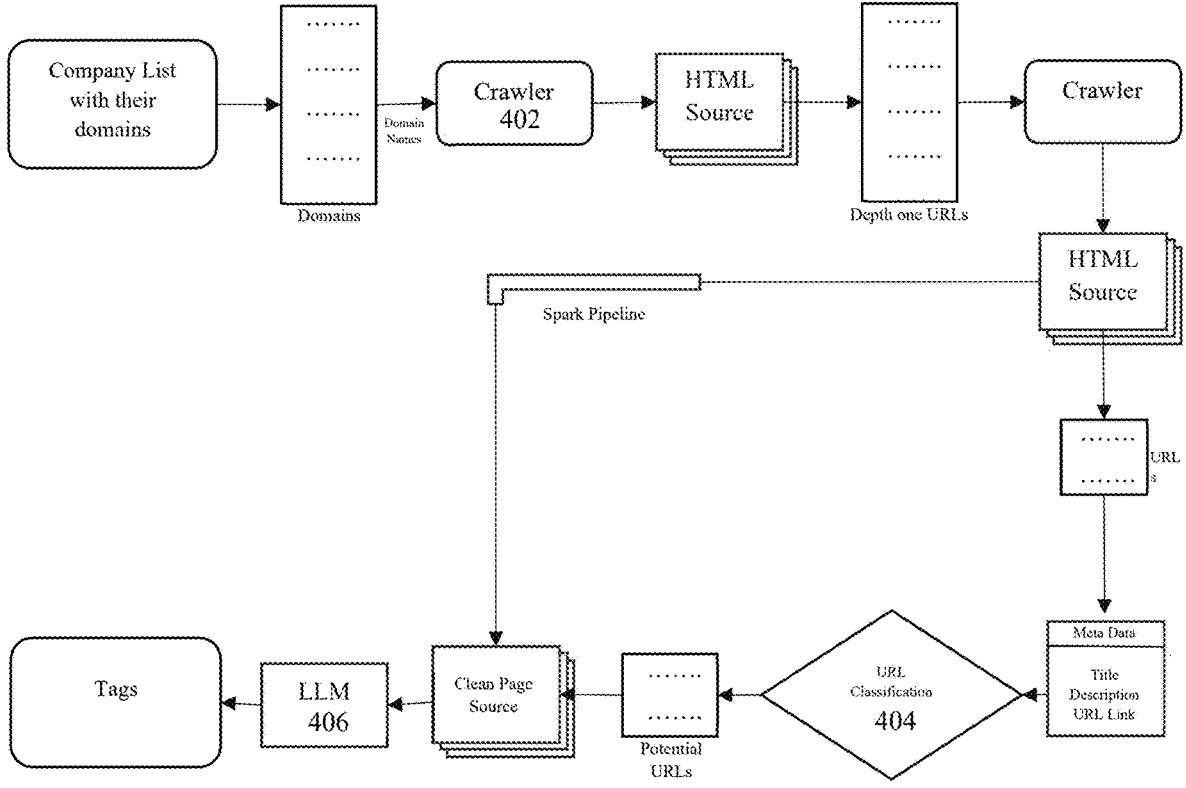
FIG. 4 illustrates a system for efficiently extracting and categorizing information from online sources, in accordance with an embodiment of the present subject matter.

Referring to FIG. 4 now, in an exemplary embodiment, in operation the system is configured to efficiently extracting and categorizing information from online sources by using one or more steps disclosed. For example, a crawler 402 is configured to obtain a list of companies with their domain names. The crawler 402 may further be configured to perform a depth-1 URL analysis and collect depth-1 URLs linked to a company's homepage. The URL classification model 404 may be configured to predict one or more URLs of the collected depth-1 URL's that contain information for generating tags. The analysis may include analysing the meta data associated with the depth-1 URL's. The content from the predicted one or more URL's may be extracted and shared with the LLM 406 to generate one or more tags.

The system introduces an efficient approach to overcoming the challenge of redundant crawling by leveraging a classification model to prioritize and predict the relevance of URLs. Specifically, the web crawler collects depth-1 URLs (links directly linked from a company's homepage) and employs a fine-tuned Bidirectional Encoder Representations from Transformers (BERT) model to identify the URLs most likely to contain valuable information. By predicting relevance early in the crawling process, the system eliminates the need to indiscriminately visit all links, ensuring that computational resources are directed toward extracting meaningful content. This reduces unnecessary resource consumption, including CPU cycles, memory, and bandwidth, while improving the overall efficiency of the crawling operation.

To address the challenge of efficient data extraction at scale, the system incorporates a content extractor specifically designed to parse and retrieve data from the predicted URLs. This extractor utilizes specialized modules for parsing, ensuring that dynamic and asynchronous content, often loaded via JavaScript or AJAX, is captured accurately. By handling the complexities of modern webpage structures, such as rendering JavaScript and parsing intricate DOMs, the content extractor ensures that valuable information is retrieved even from complex websites. This significantly reduces the computational overhead associated with processing dynamic web content, enabling the system to scale effectively to large datasets.

The system tackles the challenge of data categorization by employing advanced natural language processing (NLP) techniques to segment extracted content into contextually relevant sections. These sections are identified based on thematic shifts and semantic relevance, ensuring that the extracted data is well-organized and meaningful. Furthermore, a large language model (LLM) processes these segments using dynamically adapted instructions tailored to specific target categories and characteristics of the content. This approach allows the system to generate precise tags and classifications, creating structured outputs that can be directly utilized for downstream applications. By combining predictive URL classification, robust content extraction, and advanced NLP-driven categorization, the system effectively overcomes the primary technical challenges of modern web crawling. It eliminates redundant operations, optimizes resource utilization, and delivers structured, contextually relevant data at scale. This innovation enables scalable and efficient information extraction, making it well-suited for managing the complexities of today's web environment.

Exemplary embodiments discussed above may provide certain advantages. Though not required to practice aspects of the disclosure, these advantages may include those provided by the following features. The present method and system represent a significant advancement in the field of business information extraction and categorization, offering several key advantages over existing solutions. By leveraging cutting-edge machine learning techniques and large language models (LLMs), w a more efficient, accurate, and scalable solution has been created for extracting and curating business information. The core innovation of the present system lies in its multi-stage approach to content processing. Unlike conventional web crawlers that indiscriminately extract content from entire websites, the present solution incorporates a sophisticated classification model that accurately predicts which URLs are likely to contain specific business information. This precision in URL filtering significantly reduces noise and increases the quality and relevance of the extracted data, minimizing the processing of irrelevant or redundant information that typically plagues other scraping solutions.

To illustrate this innovative approach, consider the following example: A company's homepage, "www.abcd.com", contains links to 1,000 different URLs within its domain. In a conventional web crawling system, all 1,000 URLs would be crawled and their content extracted, regardless of relevance. This approach would consume significant computational resources and time, while potentially gathering large amounts of irrelevant data. In contrast, the present system employs its classification model to analyse these 1,000 URLs. The model examines various features of each URL, such as its structure, associated page title, and meta description. Based on this analysis, the model predicts which URLs are most likely to contain relevant business information. For instance, the classification model might determine that only 50 out of the 1,000 URLs are highly likely to contain valuable information. These 50 URLs might include pages such as: 1. www.abcd.com/about-us, 2. www.abcd.com/products, 3. www.abcd.com/services, 4. www.abcd.com/leadership-team, 5. www.abcd.com/contact. The system would then proceed to crawl and extract content from only these 50 URLs, ignoring the other 950 URLs that are deemed less relevant. This targeted approach offers several advantages: 1. Reduced Computational Load: By processing only 5% of the total URLs, the system significantly reduces the computational power required for crawling and content extraction. 2. Improved Efficiency: The time needed to complete the crawling and extraction process is drastically reduced, allowing for faster generation of tags. 3. Enhanced Data Quality: By focusing on the most relevant URLs, the system ensures that the extracted data is more likely to contain valuable business information, improving the quality of the generated tags. 4. Minimized Noise: The exclusion of less relevant URLs reduces the amount of irrelevant data that needs to be filtered out in later stages of the process. 5. Scalability: This approach allows the system to efficiently handle websites with a large number of pages, making it scalable for businesses of various sizes. In this example, by crawling only 50 URLs instead of 1,000, the system may save up to 95% of the computational resources and time that would have been required by a conventional web crawler. This efficiency gain becomes even more significant when processing multiple company websites or when dealing with larger, more complex web presences. This targeted, intelligent approach to URL selection and content extraction represents a significant advancement in the field of automated business information gathering, enabling more efficient and accurate generation of tags.

The multi-stage content curation pipeline represents another significant improvement over existing methods. By implementing a structured handoff between extraction, curation, and processing stages, the present system ensures that only the most relevant content is fed into the LLM for tag generation. This balanced approach to automation and intelligent content curation results in higher-quality output compared to traditional, less-targeted scraping techniques. The use of LLMs for domain-specific tag generation is a particularly innovative aspect of the present system. By optimizing this step to produce accurate and comprehensive tags based on context-aware interpretations of the extracted data, the system achieves a level of nuance and accuracy that significantly surpasses existing methods relying on more rigid or rule-based systems. This allows the present system to better reflect the intricacies of modern business models and technologies in the generated tags. Furthermore, the present solution's scalability and flexibility across various business domains set it apart from more static alternatives. The system's ability to adapt to different industries and business types without extensive reconfiguration makes it a versatile and future-proof tool for business intelligence gathering.

The non-obvious nature of the present method and system is evident in its novel integration of multiple advanced technologies. The combination of a classification model for URL filtering, a multi-stage content curation pipeline, and the use of LLMs for tag generation represents a significant leap forward in the field. This approach not only enhances the accuracy and relevance of the extracted information but also provides a deeper, more contextual understanding of the business data being analysed. In summary, the present method and system offer increased relevance and precision in data extraction, scalability across diverse business domains, significant reduction in data noise, and enhanced contextual understanding of business information. These advantages position the present system as a powerful and innovative tool for generating high-quality tags, representing a substantial improvement over existing technologies in the field of business intelligence gathering.

Although implementations for methods and system efficiently extracting and categorizing information from online sources, described in language specific to structural features and/or methods, it is to be understood that the appended claims are not necessarily limited to the specific features or methods described. Rather, the specific features and methods are disclosed as examples of implementations for automatically generating an email and associated email strategy based on user data.

The invention claimed is:

1. A system for avoiding redundant crawling by applying targeted URL filtering techniques, comprising:

a memory storing one or more instructions; and at least a processor communicatively coupled to the memory and configured to:

load a home-page uniform resource locator (URL), wait until Document Object Model (DOM) events indicate that client-side scripts have finished rendering dynamic content, and capture rendered HTML of the home page;

parse the rendered HTML to collect one or more internal hyperlinks reachable by a single click from the home page, filter out non-HTML resources, and produce a list of first-level internal URLs (depth-1 URLs), wherein the rendered HTML is parsed in a distributed real time data processing architecture comprising a master node;

execute a classification model on the list of first-level internal URLs to predict a subset of URLs comprising information for generating tags, wherein predicting the subset of URLs comprises:

extracting features from each of the first-level internal URL, including at least one of: URL structure, page title, and meta description;

input the extracted features into the classification model, wherein the classification model is a fine-tuned Bidirectional Encoder Representations from Transformers (BERT) model that is trained on webpages from one or more company websites, including both structured and non-structured data, and wherein each webpage in training dataset is marked as one of relevant or not relevant;

computing, via the classification model, a probability score indicating a likelihood if a first-level internal URL of the list of first-level internal URLs comprises information for tag generation;

predicting, based on the computed probability score, the subset of URLs with probability scores exceeding a predefined threshold for the tag generation; and continuously fine tuning the classification model with the predicted subset of URLs for next iterations for refinement in the classification model's performance to improve prediction accuracy of the classification model over a period of time;

parse a URL of the subset of URLs to obtain parsed text, wherein the master node is configured to generate a plurality of worker nodes and distribute the subset of URLs amongst the plurality of worker nodes, wherein the master node is configured to determine whether the URL in the subset of URLs has already been parsed before a worker node initiates the parsing, thereby avoiding redundant parsing;

execute, on the parsed text, a machine learning model trained for adaptive segmentation to identify one or more sections in the parsed text;

segment the one or more sections into one or more contextual segments and storing the one or more contextual segments based on a hierarchal relationship between the one or more sections; and generate the tags through contextual analysis by applying a large-language model (LLM) to the one or more contextual segments.

2. The system of claim 1, wherein producing the list of first-level internal URLs (depth-1 URLs) further comprising:

following HTTP redirects for each depth-0 (homepage) or depth-1 URL to reach a terminal URL while storing a redirect chain and aborting on a detected redirect loop; and applying fuzzy-matching heuristics, sitemap parsing, and link-scoring rules to discard irrelevant, duplicate, or orphaned links, thereby generating a filtered set of URLs.

3. The system of claim 1, wherein the classification model is further configured to classify each webpage into one or more predefined categories.

4. The system of claim 1, wherein the classification model is further configured to:

analyse the URL structure, the page title, and the meta description of each of the first level internal URLs.

5. The system of claim 1, wherein segmenting the one or more sections into the one or more contextual segments includes:

analyzing HTML structure to detect boundaries indicated by heading tags, section, lists, horizontal rules, whitespace or font-style changes; and applying natural-language-processing algorithms that identify thematic shifts, the algorithms including topic-modelling or text-clustering techniques that use Latent Dirichlet Allocation (LDA) and semantic-similarity metrics derived from word-embedding vectors, and when required, invoking the machine-learning model trained on an annotated corpus of business-website pages to predict section breaks from combined textual and structural features.

6. The system of claim 5, wherein the heading tags include at least one of: industry vertical, headquarter address, countries of operation, contact details, leadership information, product names, business type, solution offerings, business model, current stage of development, technology stack, target audience, and company description.

7. The system of claim 1, wherein the processor is further configured to store, for each depth level, the parsed text in a respective storage unit dedicated to that depth level, such that content from the home page is held in a first storage unit, content from depth-1 pages is held in a second storage unit, and so on for each additional depth level.

8. The system of claim 7, wherein the processor is further configured to generate an index that, for every stored content item, records: (a) a reference to the corresponding URL; (b) an indicator of the depth level; (c) metadata that includes a page title, keywords and a content summary; and (d) references to child URLs located at the next-deeper depth level.

9. The system of claim 8, wherein a retrieval query prioritises index entries from shallower depths over deeper depths, thereby reducing computational load when the requested information is present at depth 0 or depth 1.

10. A method for avoiding redundant crawling by applying targeted URL filtering techniques, comprising:

loading, by a processor, a home-page uniform resource locator (URL), wait until Document Object Model (DOM) events indicate that client-side scripts have finished rendering dynamic content, and capture rendered HTML of the home page;

parsing, by the processor, the rendered HTML to collect one or more internal hyperlink reachable by a single click from the home page, filter out non-HTML resources, and produce a list of first-level internal URLs (depth-1 URLs), wherein the rendered HTML is parsed in a distributed real time data processing architecture comprising a master node;

executing, by the processor, a classification model on the list of first-level internal URLs to predict a subset of URLs comprising information for generating tags, wherein predicting the subset of URLs comprises:

extracting features from each of the first-level internal URL, including at least one of: URL structure, page title, and meta description;

input the extracted features into the classification model, wherein the classification model is a fine-tuned Bidirectional Encoder Representations from Transformers (BERT) model that is trained on webpages from one or more company websites, including both structured and non-structured data, and wherein each webpage in training dataset is marked as one of relevant or not relevant;

computing, via the classification model, a probability score indicating a likelihood if a first-level internal URL of the list of first-level internal URLs comprising information for generating the tags;

predicting, based on the computed probability score, the subset of URLs with probability scores exceeding a predefined threshold for the tag generation; and continuously fine tuning the classification model with the predicted subset of URLs for next iterations for refinement in the classification model's performance to improve a prediction accuracy of the classification model over a period of time;

parsing a URL, by the processor, of the subset of URLs to obtain parsed text, wherein the master node is configured to generate a plurality of worker nodes and distribute the subset of URLs amongst the plurality of worker nodes, wherein the master node is configured to determine whether the URL in the subset of URLs has already been parsed before a worker node initiates the parsing, thereby avoiding redundant parsing;

executing, on the parsed text, a machine learning model trained for adaptive segmentation to identify one or more sections in the parsed text;

segmenting, by the processor, the one or more sections into one or more contextual segments and storing the one or more contextual segments based on a hierarchal relationship between the one or more sections; and generating, by the processor, the tags through contextual analysis by applying a large-language model (LLM) to the one or more contextual segments.

* * * * *